United States Patent [19]

Clarke et al.

[11] 4,278,046

[45] Jul. 14, 1981

[54] PAINT SPRAYING APPARATUS

[75] Inventors: Ronald M. Clarke, Brownhills; Edward Johnston, Chertsey, both of England

[73] Assignee: Carrier Drysys Limited, London, England

[21] Appl. No.: 921,149

[22] Filed: Jun. 30, 1978

[30] Foreign Application Priority Data

Apr. 19, 1978 [GB] United Kingdom ............... 15495/78

[51] Int. Cl.³ ...................... B05B 12/02; B05C 15/00
[52] U.S. Cl. .................................... 118/695; 118/697; 118/323; 118/326; 134/57R; 239/69
[58] Field of Search ................. 118/7, 8, 11, 323, 326, 118/695, 697, 698, 704, 696, 634, DIG. 7; 239/69, 186; 134/57 R

[56] References Cited

U.S. PATENT DOCUMENTS

| 3,270,711 | 9/1966 | Leach | 118/326 X |
| 3,529,572 | 9/1970 | Rose | 118/7 |
| 3,593,308 | 7/1971 | Fagan | 118/2 X |
| 3,777,702 | 12/1973 | Fitzgerald | 118/2 |
| 4,108,105 | 8/1978 | Wiggins | 118/8 X |
| 4,133,290 | 1/1979 | Melliger | 118/7 |

OTHER PUBLICATIONS

"Making Light of the Noise Problem", J. D. Merryman, Electronics, Jul. 26, 1965, pp. 52, 56.

Primary Examiner—John P. McIntosh
Attorney, Agent, or Firm—Sughrue, Rothwell, Mion, Zinn and Macpeak

[57] ABSTRACT

In an automatic paint spraying apparatus automatic control means comprises two parts, the first part providing programmable control means for determining a desired sequence of operations and the second part comprising position indicating means for generating an electrical digital signal representing the position of a spray gun and comparator means for comparing the signal from the position indicating means with reference signals determining the sequence of operation and providing an output for use in controlling the spray guns, the second part of the automatic control means being arranged for location within a paint spraying area having an hazardous atmosphere.

16 Claims, 7 Drawing Figures

PAINT SPRAYING APPARATUS

BACKGROUND OF THE INVENTION

The invention relates to paint spraying apparatus and particularly to automatically controlled paint spraying apparatus.

Such automatically controlled paint spraying apparatus is particularly applicable to the spraying of a succession of articles, such as for example, vehicle bodies, which are conveyed through a spray enclosure or booth past a spray station provided with one or more spray guns. The spray guns may be reciprocated perpendicular to the direction of travel of the articles so as to apply paint in strokes across the articles. Due to the varying shapes of articles to be sprayed, it is necessary to control the application of paint through the spray guns to provide varying length painting strokes in dependence on the part of the article adjacent the spray station. In many cases the spraying is carried out in booths having a carefully controlled atmosphere but due to the paint solvents, the atmospheres in spray booths are normally considered as hazardous requiring strict control on the equipment which may be used within the spray booth. Regulations controlling the equipment, particularly electrical equipment, which may be used in such hazardous areas has become more stringent and in order to avoid the need for flameproof or explosion-proof casings, more control equipment has been located in safe areas outside the spray booth and this has to be connected to limited control equipment within the spray booth. Due to the extent which it has been necessary to locate substantial parts of the control equipment outside the spray booth, extensive connections have been necessary between the equipment outside the booth and that inside the booth.

SUMMARY OF THE INVENTION

It is an object of the present invention to provide improved automatic paint spraying apparatus including electrical digital control equipment which is suitable for location within the hazardous area.

The present invention provides apparatus for automatic paint spraying, which apparatus comprises a spray gun for directing paint onto an article to be coated, reciprocating means for effecting a reciprocating stroke of the spray gun, valve means operable to control the discharge of paint through the spray gun, and automatic control means for controlling the operation of the valve means during the stroke of the spray gun, said automatic control means comprising two parts, the first part providing programmable control means for determining a desired sequence of operations of the valve means, and the second part comprising position indicating means for generating an electrical digital signal representing the position of the spray gun during its stroke, and comparator means for comparing the signal from the position indicating means with reference signals determining the sequence of operation of the valve means during the stroke and providing an output for use in controlling the valve means in dependence on the position of the spray gun, said reciprocating means and second part of the automatic control means being arranged for location within a paint spraying area having a hazardous atmosphere.

Preferably the first part of the automatic control means is arranged for location outside an area having an hazardous atmosphere and includes a suitable interface for connecting the first and second parts of the automatic control means.

Preferably the interface provides a power supply to the second part of the automatic control means, the power supply including an intrinsic safety barrier.

Preferably the interface provides a plurality of input and output channels interconnecting the first and second parts of the automatic control means. Preferably each channel includes optically coupled isolating means.

Preferably the first part of the control means includes a programmable logic controller.

Preferably the position indicating means includes pulse generating means for generating pulses as the spray gun moves throughout its stroke and counting means for counting said pulses. Preferably reset means is provided for resetting the counting means once in each stroke.

Preferably the second part of the automatic control means includes a store for storing said reference signals and the comparator is arranged to receive signals from the store as well as from the position indicating means.

Preferably said store is arranged to store reference signals corresponding to a plurality of possible paint stroke lengths for the spray gun and the first part of the automatic control means is arranged to select which stroke length reference signals are to be fed to the comparator.

Preferably the comparator is a greater or less than comparator arranged to detect whether the signal from the position indicating means is greater or less than a reference signal value and provides an output signal accordingly.

The invention includes automatic paint spraying apparatus including a plurality of spray guns, each spray gun being provided with reciprocating means, valve means and automatic control means as aforesaid.

In such a case, one or more of the spray guns may be arranged to move vertically. One or more spray guns may be arranged to move horizontally.

Path adjusting means may be provided to move the path of the spray gun closer to or further from the article to be coated. Preferably the path adjusting means includes electrical digital control means arranged for location within the spraying area having a hazardous atmosphere. Preferably the electrical digital control means is arranged to receive reference signals from the said first part of the automatic control means indicating a desired separation between the article and the path of the spray gun. Such a path adjusting means is particularly suitable for adjusting the height of a horizontally reciprocating spray gun.

The invention includes paint spraying apparatus comprising a spray booth with one or more spray guns as aforesaid, each spray gun having associated reciprocating means, valve means and automatic control means, the first part of each automatic control means being located outside the spray booth and the second part of each automatic control means being located within the spray booth, said apparatus further comprising conveyor means for conveying a succession of articles through the spray booth.

DESCRIPTION OF THE PREFERRED EMBODIMENT

Figure 1:
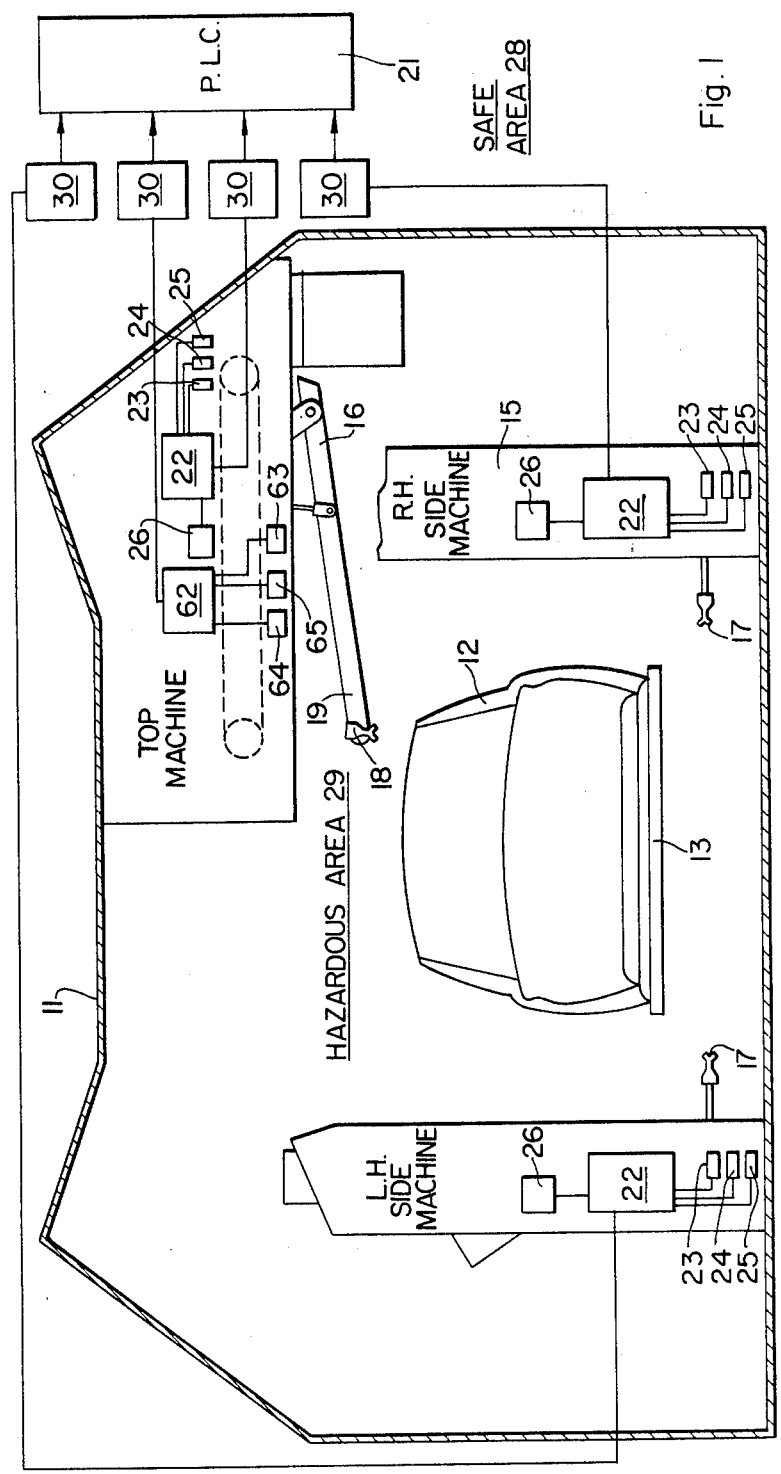
FIG. 1 is a schematic section through a spray booth in accordance with the invention.

The arrangement shown in FIG. 1 comprises a spray booth 11 having a spray station arranged for applying paint to a succession of vehicle bodies 12 carried through the spray booth on a conveyor 13. In order to apply paint to the vehicle body, the left hand side of the vehicle is coated by a left hand side spray gun machine 14, the right hand side is coated by a right hand spray gun machine 15 and the top of the vehicle body is coated by a top spray gun machine 16. The side machines 14 and 15 each have a spray gun 17 arranged to reciprocate vertically and the top machine has a downwardly facing spray gun 18 arranged to reciprocate horizontally. Each of the spray guns is arranged to reciprocate transverse to the direction of advance of the vehicle body so that paint is applied to the opposite two sides and the top of the vehicle body in strokes transverse to the direction of movement of the vehicle body. The two side machines 14 and 15 are generally similar in construction and operation and consequently only one will be described in detail. The top machine 16 is generally similar to the side machines 14 and 15 except that the spray gun 18 is mounted on a pivoted arm 19 which in addition to reciprocating, may be pivoted to alter the height of the spray gun 18 and thereby vary the separation between the path of the horizontally reciprocating spray gun 18 and the top of the vehicle body.

Each of the spray gun machines includes a similar stroke control sub-system arranged to control the operation of the spray gun during its reciprocating stroke. Each spray gun is provided with a control solenoid 26 arranged to operate a supply valve to the spray gun so that the discharge of paint through the spray gun is switched on and off during the reciprocating stroke so as to correspond with the stroke length needed to paint the part of the vehicle adjacent the spray station at that time. The way in which the operation of the spray guns is controlled during each reciprocating stroke will now be described with reference to FIGS. 2, 3 and 4.

Figure 2:
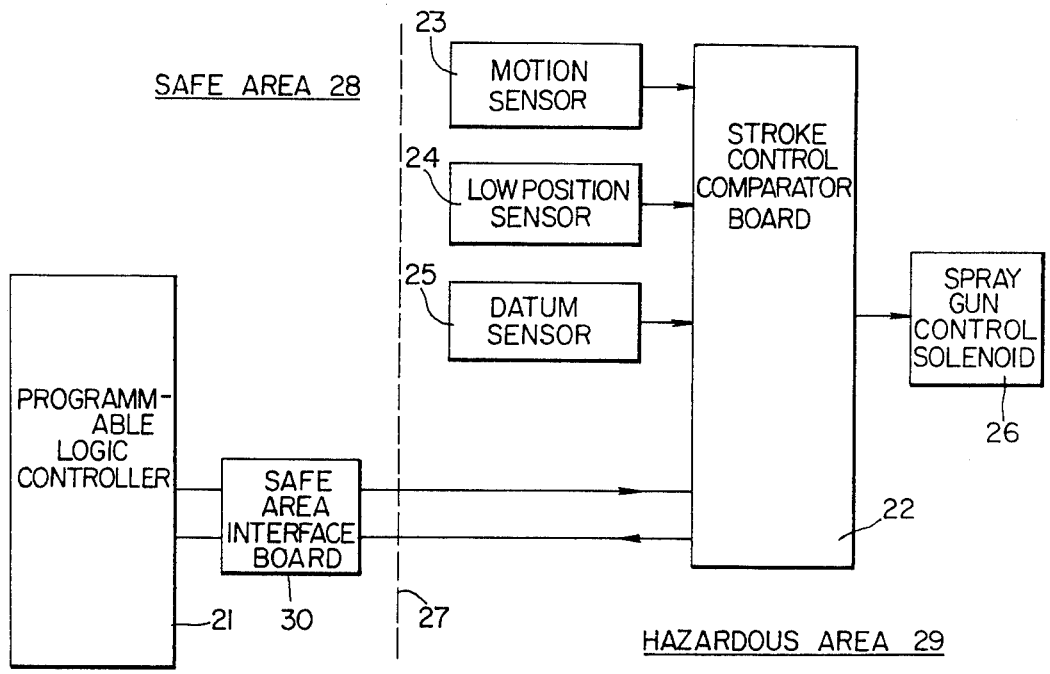
FIG. 2 is a block diagram of a stroke control subsystem for use in FIG. 1.
Figure 3:
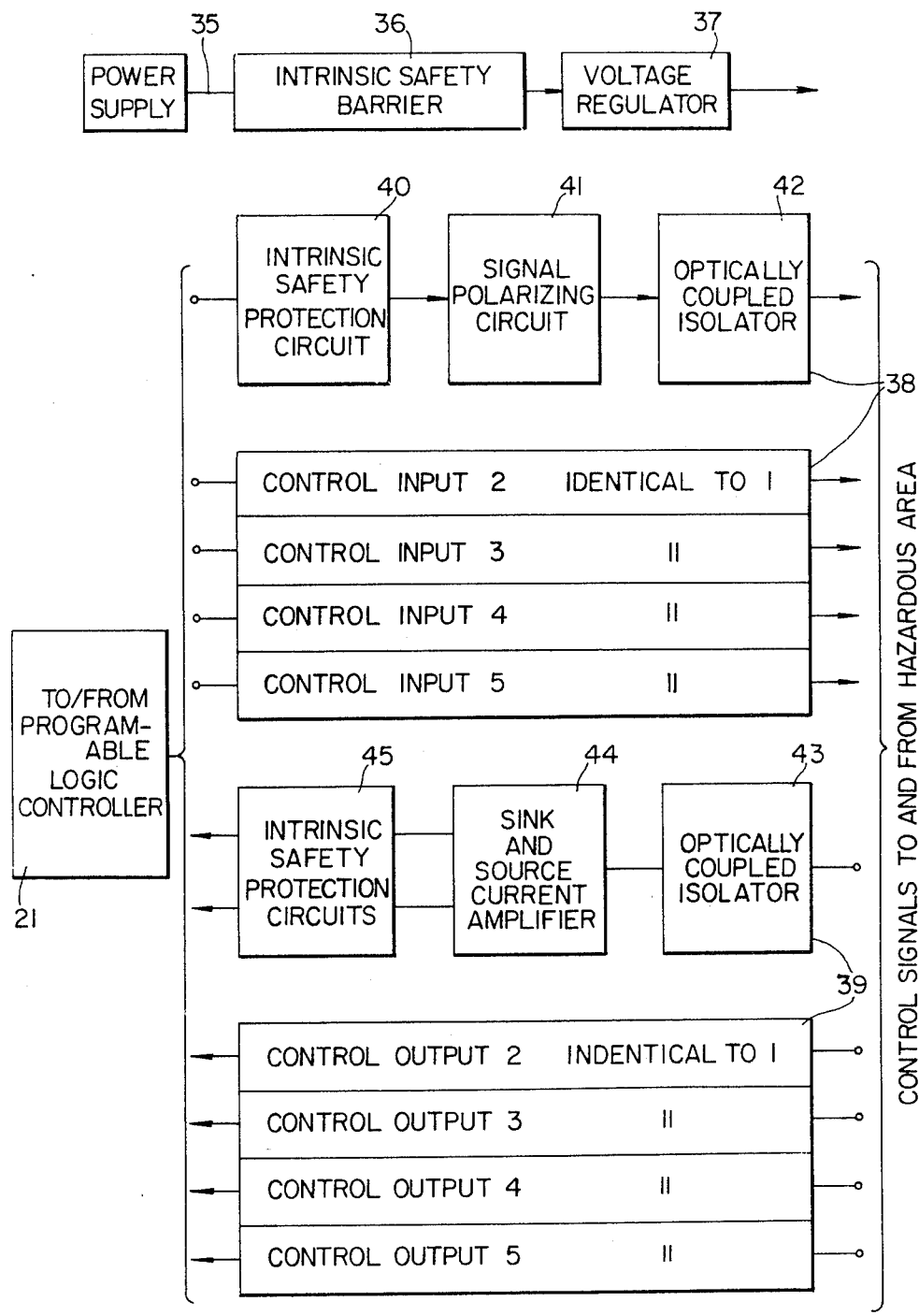
FIG. 3 is a block diagram of a safe area interface board for use in FIG. 2.

The automatic control equipment comprises two parts. The first part consists of a programmable logic controller 21 situated outside the spray booth 11, and a second part comprising a stroke control comparator board 22, motion sensor 23, low position sensor 24, datum sensor 25 and spray gun control solenoid 26, located inside the spray booth. The atmosphere inside the spray booth 11 is carefully controlled to achieve suitable conditions for applying paint to the vehicle bodies. However due to the solvents used in the paint, the area is considered to be hazardous so that there must be strict control on any electrical equipment which is used within the booth. Each of the spray guns 17 and 18 is driven in its reciprocating stroke by a certified flameproof motor and the valves used to control discharge of paint through the spray guns are certified intrinsically safe electrically operable. The motor used to raise and lower the arm 19 on the top spray gun machine is pneumatically operable. As the interior of the spray booth 11 is considered as a hazardous atmosphere, strict safety regulations apply to the electrical control equipment which can be used inside the booth and the area outside the booth is considered as a safe area where the same restrictions do not apply. In FIG. 2, the broken line 27 is used to designate the division between the safe area 28 and the hazardous area 29. In order to provide communication between the programmable logic control 21 and the control equipment which is contained within the hazardous area 29, a safe area interface board 30 is provided in the safe area to provide suitable connections between the programmable logic controller 21 and the remaining control equipment.

The programmable logic controller 21 comprises a standard device which may be programmed to cover a number of possible operating strokes for each of the spray guns. In order to provide a satisfactory communication with the second part of the control equipment which is contained within the spary booth, the safe area interface board is provided and this will be described in greater detail with reference to FIG. 3. Firstly, the safe area interface board 30 provides a power supply to the second part of the control equipment in the hazardous area. The interface board includes in the power supply line 35 an intrinsic safety barrier 36, which limits the voltage and current supplied, and a voltage regulator 37. In this way, the interface board provides an electrical supply with a defined amount of possible power, in terms of voltage and current, and the voltage is regulated. In order to transmit control signals from the programmable logic controller 21 to the second part of the control equipment in the hazardous area and to return control signals in the reverse direction, five control input channels 38 are provided in the interface board as well as five output control channels 39. With regard to the input channels, all these are the same although one has been shown in detail. This consists of an intrinsic safety protection circuit or fuse 40 followed by a signal polarising circuit 41. This enables positive supply signals as well as negative supply signals to be used so that the apparatus can be used with a variety of programmable logic controllers. The output of the polarising circuit 14 is fed through an optically coupled isolator 42 so as to avoid a direct current connection between the safe area 28 and the hazardous area 29. In this way, a high value of electrical insulation is provided between the two areas and the amount of energy transferred in the form of photons through the optically coupled isolator is very small.

The control output channels 39 are generally similar in that each consists of an optically coupled isolator 43 followed by a sink and source current amplifier 44 and an intrinsic safety protection circuit 45. The sink and source current amplifier 44 enables the control output to accept a given current signal or provide a given current signal so as to match a variety of programme logic controllers.

Figure 4:
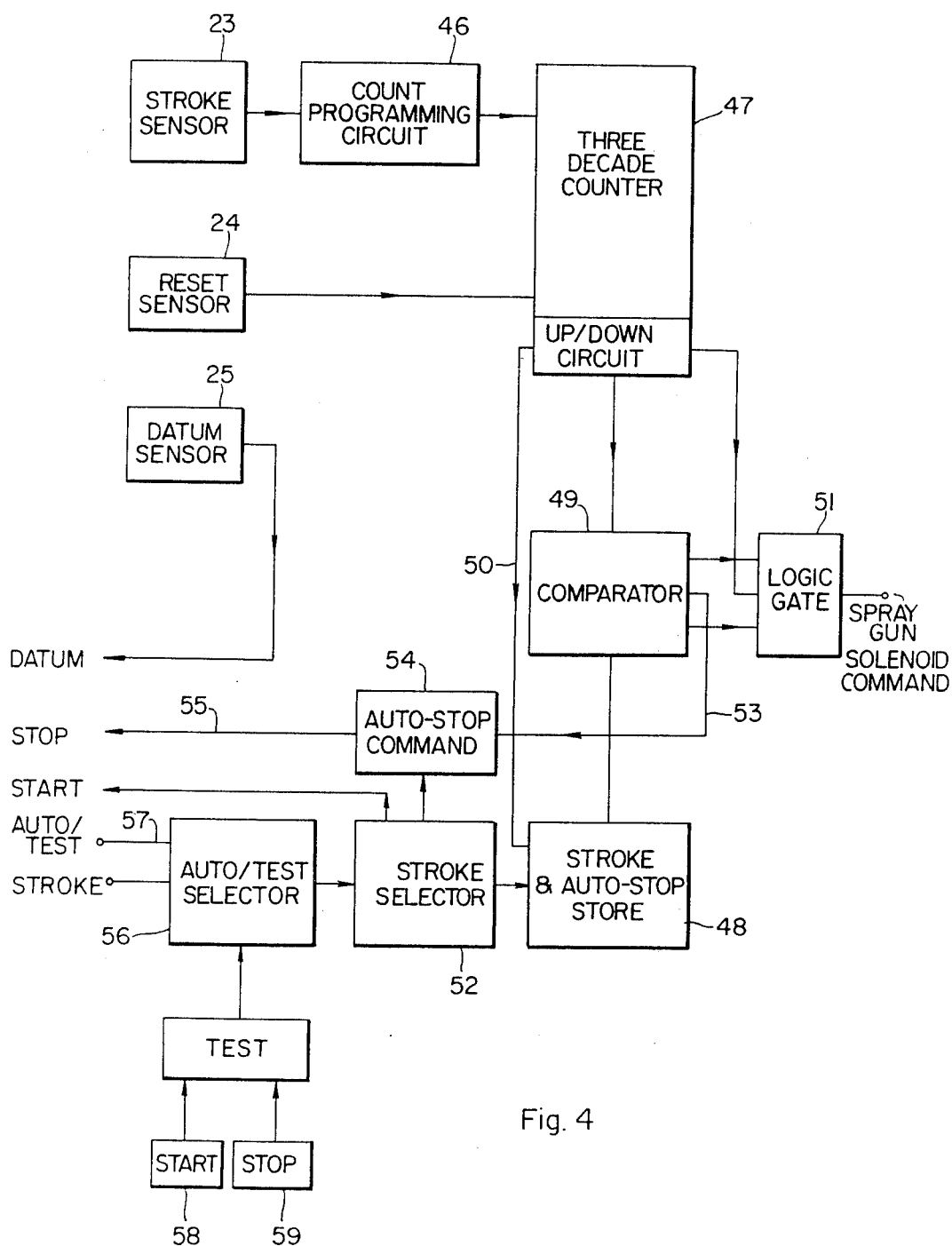
FIG. 4 is a block diagram of a stroke control comparator board for use in FIG. 2.

The sensors 23, 24 and 25 are shown in FIG. 4 where the control comparator board 22 is shown in greater detail. With regard to the sensors, these are conventional position and motion sensors of the standard inductive proximity detector type suitable for use in a hazardous area. The motion sensor 23 is arranged adjacent a disc coupled to the drive mechanism of the spray gun. The disc has 20 slots around its periphery so that a the gun moves, the periphery of the disc passes the sensor and generates a train of pulses. These pulses are fed through a count proportioning circuit 46 to a counter 47 on the stroke control comparator board 22. The low position sensor 24 is set to operate for a short time, as the reciprocating spray gun reaches its lowest position. The output from this sensor is fed to the counter 47 and used to reset the counter once in each stroke of the spray gun. The datum sensor 25 is set to operate as the reciprocating spray gun reaches the bottom of its stroke. It is similar to the low position sensor but covers a longer distance and is used to check that the gun is stationary and at the beginning of its stroke. This information is not required for the stroke comparator operation but it is required for other programming operations by the programmable logic controller 21 and for convenience, the output of the datum sensor 25 is fed through the stroke comparator board 22 to the interface board 30 and thus to the programmable logic controller 21.

The stroke comparator board 22 is used to switch the spray gun on and off as it reciprocates across the article to be painted. The board includes a stroke and auto stop store 48 in which are stored six different stroke lengths any one of which can be selected by a coded signal from the programmable logic controller 21. Depending on the control signal fed from the controller 21 through the interface board 30, on and off instruction points corresponding to the selected stroke are fed from the store 48 into a comparator 49. This comparator is a digital greater than or less than comparator. Signals from the sensor 23 are fed through the proportioning circuit 46 to the counter 47. The proportioning circuit is used to reduce the number of pulses produced such that only 100 are passed to the counter for the outward stroke and a further 100 for the return stroke. At the end of the return stroke the low position sensor 24 resets the counter to zero. The proportioning circuit 46 is necessary in order that the same stroke comparator board 22 can be used with different sizes of reciprocator producing different numbers of pulses per stroke. The counter thus counts from 000 to 099 on its upward or outward stroke and from 100 to 199 on its downward or return stroke. The counter 47 is arranged to provide a signal along line 50 to the stroke store 48 and the output signal from the most significant digit of the counter is used to control the store 48 such that when the signal is "0" the "up" values are fed to the comparator 49 and when it is "1" the "down" values are used. The 00 to 99 output signals of the counter are fed to the other input of the comparator 49. The comparator is a two stage comparator in which the first stage compares the counter output with a value from the store 48 specifying the switch-on point of the spary gun. The second stage compares the counter output with a value from the store 48 specifying the switch-off point of the spray gun. The output from the first stage changes to an "on" state when the counted value becomes greater than the stored value. The output from the second stage changes to an "off" state when the counted value becomes greater than the stored value. These two signals are fed to a logic "and" gate 51 which produces an "on" signal when both the input signals are "on". This output signal from the logic gate 51 is used to control the spray gun solenoid valve 26.

When it is desired to change to another stroke length for the spray gun, such as will occur when the article advances to a new position so that the extent of article to be coated is either greater or less than the previous part of the article to be coated, the programmable logic controller 21 sends another appropriate coded signal to the stroke comparator board and immediately a new operating stroke for the spray gun is used. When it is desired to stop the reciprocation and halt the spray gun at a datum position, the programmable logic controller 21 sends a signal signifying stop. This signal reaches a stroke selector 52 which decodes the signal and instead of causing a set of stroke values to be passed from the store 48 to the comparator 49, it selects the stored "auto-stop" value. This is the value of the point in the cycle at which the reciprocator motor must be switched off and breaking applied in order that it will come to rest at datum position. The comparator now compares the auto-stop value with the counted value from the sensor 23 and when they are equal it provides an output pulse on line 53 which is gated with the original decoded stop signal and then stored in a store 54 as the auto-stop command signal. This auto-stop command signal is passed along line 55 to the safe area interface board 30 and to the programmable logic controller 21.

It is possible that under test conditions it may be necessary to operate the stroke selection and reciprocation control locally at the spray gun machine in the spray booth. For this purpose an auto test selector 56 is provided and this can be switched by a signal on line 57 from the safe area interface board 30 so as to select the test position. The required stroke length may then be selected by number on a binary coded switch. Reciprocation is started and stopped by manual operation of start and stop buttons 58 and 59.

The spray gun control solenoid 26 is a standard low power intrinsically safe device suitable for use in zone 1 hazardous atmospheres.

Figure 6:
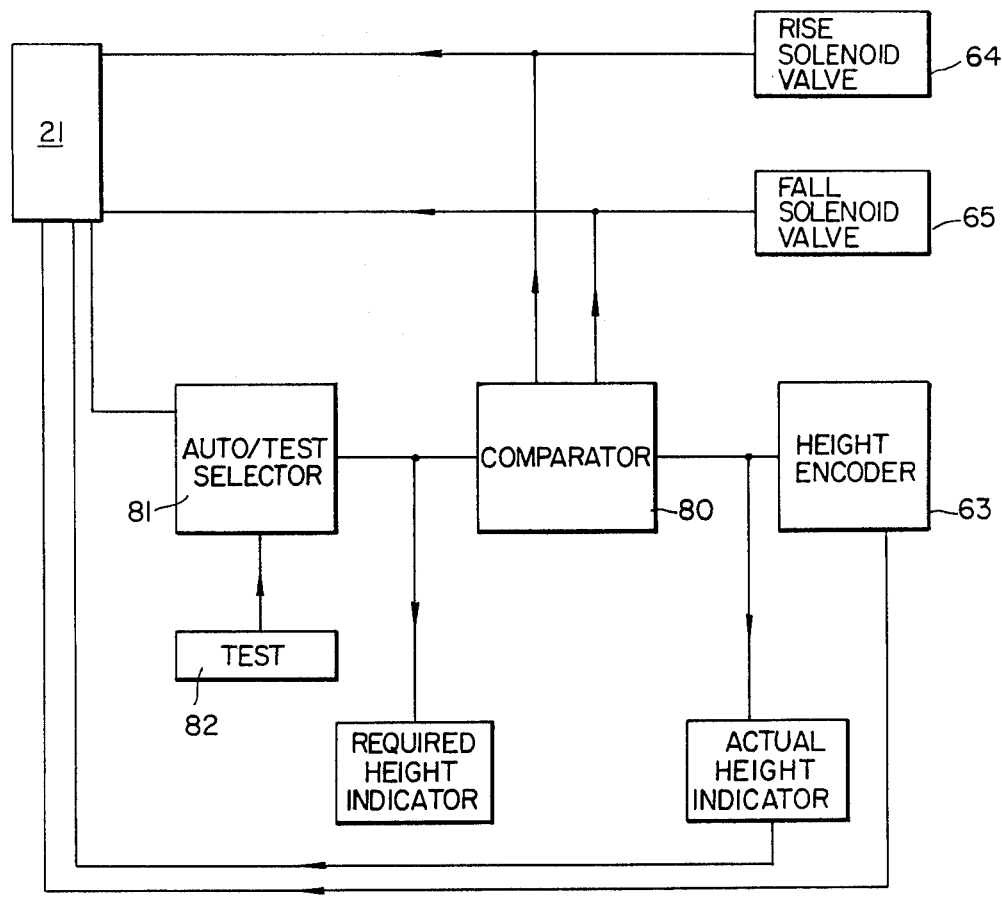
FIG. 6 is a block diagram of a height control comparator for use in FIG. 5.
Figure 7:
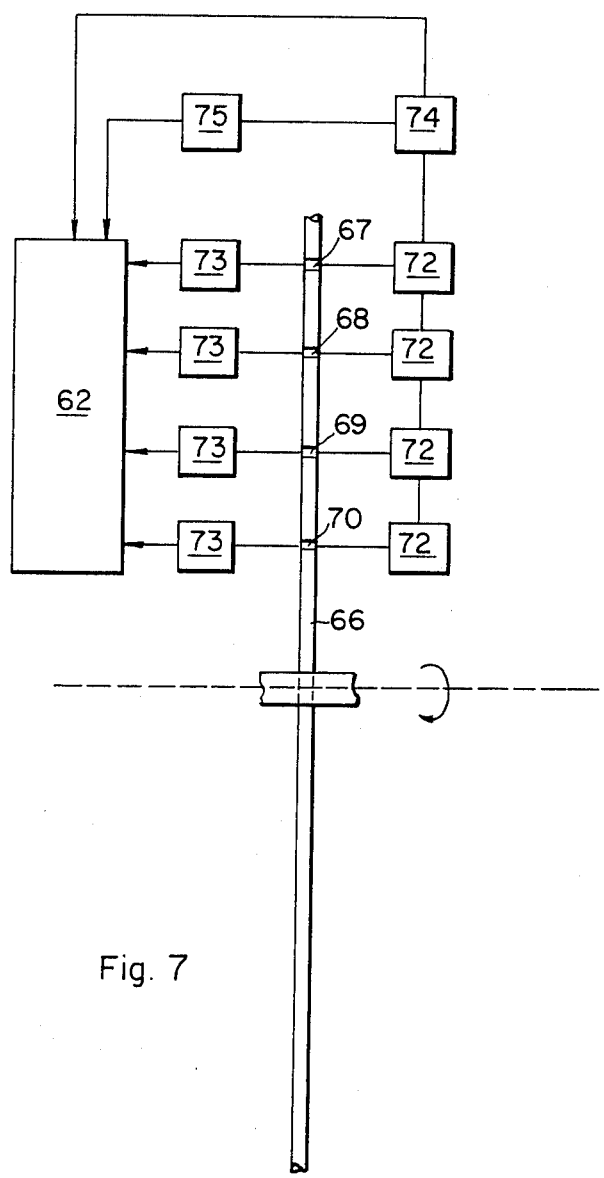
FIG. 7 shows a height encoder for use in FIG. 5.

As already indicated, the above described stroke control sub-system is applicable to the vertical and horizontal spray guns. However, the horizontal spray gun 18 has an additional height control sub-system which will now be described with reference to FIGS. 5, 6 and 7.

Figure 5:
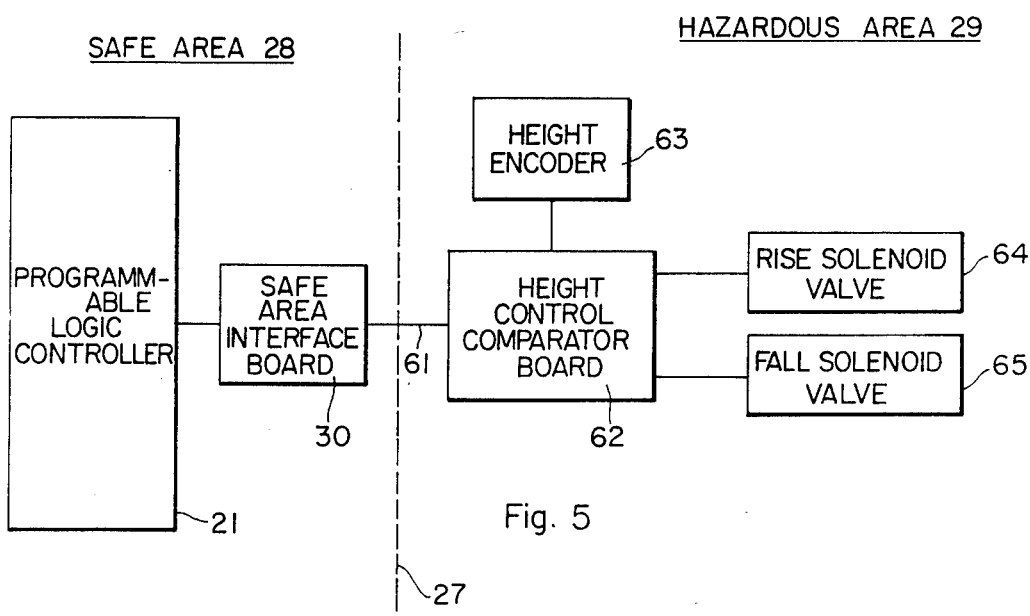
FIG. 5 is a block diagram of a height control subsystem for use in FIG. 1.

The essential components are shown in FIG. 5. This consists of safe area interface board 30 located in the safe area 28 and connected to the programmable logic controller 21. The output from the board 30 is connected by line 61 to the second part of the control equipment contained within the hazardous area 29. This consists of a height control comparator board 62 arranged to receive an input signal from a height encoder 63 and provide output signals to a rise solenoid valve 64 and a fall solenoid 65. The solenoid valves 64 and 65 are arranged to control the pneumatic motor causing pivotal movement of the arm 19 shown in FIG. 1 so as to cause the spray gun 18 to rise or fall. The valves 64 and 65 are again standard low power solenoid valves suitable for use in zone 1 hazardous areas. The height encoder 63 is arranged to provide an electrical signal output indicating the detected height of the spray gun 18. The encoder consists of a thin metal disc 66 arranged to rotate as the arm 19 rises or falls. The disc is etched to produce a pattern of slots in four annular tracks 67, 68, 69 and 70. The disc is divided into 18 equal segments, 16 of these segments each contain a unique arrangement of slot or no-slot in the four tracks that traverse the segment. Two segments are unused and act as a buffer zone between the first and last segments. Thus 16 segments are sequentially encoded with the binary code for 0 to 15. The disc is "read" by means of four infra-red radiation emitters 72 placed on one side of the disc passing energy through the slot to four infra-red radiation sensors 73 placed on the other side of the disc. Each couple of infra-red radiation emitter and sensor is aligned with a particular track and detects the slot or no-slot condition of each segment as the disc is rotated. Thus the output signals from the infra-red radiation sensors 73 represent the rotational position of the disc as 16 possible positions. The disc is mechanically coupled to the rise and fall mechanism in such a way that the 16 positions result in 16 heights, from top to bottom, of the spray gun arm 19. A fifth light emitter 74 and sensor 75 is included in the assembly but is not impeded by the disc so that the output from the sensor 75 is a continuous "on" condition which is used to infer the satisfactory operation of the encoder as a whole since the same drive current flows through all five emitters. This drive current is obtained from the height control comparator board 62 which is shown more fully in FIG. 6. The comparator board 62 includes a greater or less than comparator 80 arranged to receive the output signals from the height encoder 63. This amplifies the signals to a standard logic level and compares their value with signals received from an auto test selector 81. In the auto mode, the desired height is received in coded form from the programmable logic controller 21 and passed to the comparator 80. The comparator will then give one of three possible outputs. If the desired height is greater than the actual height, then a rise instruction will be given to the rise solenoid valve 64. If the desired height is lower than the actual height then a fall instruction will be given to the fall solenoid valve 65. If the desired height is equal to the actual height then neither of the valves 64 or 65 is actuated.

Two identical checking circuits are included on the board 62. One accepts the coded signals of the actual height at the input of the comparator 80, decodes them and drives a 16 lamp indicator panel. Thus the actual height of the spray gun arm is uniquely indicated by these 16 numbered lamps. The other checking circuit accepts the coded signals of the desired height present at the other input of the comparator, decodes them and uniquely indicates the desired height also as one of 16 lamps. The lamps are low power, high brightness, light emitting diodes.

In order to test the height control sub-system locally on the spray gun machines in the booth, the auto test selector is moved to a test condition by operation of a test switch 82. The required height is set on a 16-position switch and the appropriate rise or fall signal is fed immediately to the solenoid valve in order to bring the spray gun arm to the desired height.

It will be appreciated that in the above described example, a substantial part of the control equipment is provided by the aforementioned second part of the control equipment which is located within the hazardous area. This results in a small part of the control equipment being located outside the hazardous area and consequently complicated and expensive communication channels between the exterior of the hazardous area and the interior, are avoided. Similarly, the equipment which is located within the hazardous area is essentially formed from C-MOS integrated circuits which can safely be operated in the hazardous area without the use of flameproof and explosion-proof enclosures.

The invention is not limited to the details of the foregoing example.

We claim:

1. Apparatus for automatic paint spraying, comprising booth means to contain a hazardous atmosphere in which spraying is effected, said booth means being surrounded externally by a non-hazardous atmosphere, said apparatus further comprising a spray gun for directing paint onto an article to be coated, reciprocating means for effecting a reciprocating stroke of said spray gun, valve means operable to control discharge of paint through said spray gun, and automatic control means for controlling the operation of the valve means during the stroke of said spray gun; said automatic control means comprising: a first part providing programmable control means for determining a desired sequence of operations of said valve means, a second part comprising position indicating means for generating an electrical digital signal representing the position of the spray gun during its stroke, and comparator means for comparing the signal from the position indicating means with reference signals from said programmable control means determining the sequence of operation of said valve means during the stroke and providing an output for use in controlling said valve means in dependence on the position of said spray gun; wherein said reciprocating means, valve means and second part of said automatic control means are located within said booth means and the said first part of said automatic control means is located entirely outside said booth means and connected through a suitable interface to the said second part of the automatic control means, whereby said programmable control means is not exposed to said hazardous atmosphere.

2. Apparatus as claimed in claim 1 in which said interface provides a power supply to said second part of said automatic control means, said power supply including an intrinsic safety barrier.

3. Apparatus as claimed in claim 1 in which said interface provides a plurality of input and output channels interconnecting said first and second parts of said automatic control means.

4. Apparatus as claimed in claim 3 in which each channel includes optically coupled isolating means.

5. Apparatus as claimed in claim 1 in which said first part of the said control means includes a programmable logic controller.

6. Apparatus as claimed in claim 1 in which said position indicating means includes pulse generating means for generating pulses as said spray gun moves throughout its stroke and counting means for counting said pulses.

7. Apparatus as claimed in claim 1 in which said second part of said automatic control means includes a store for storing said reference signals, and said comparator is arranged to receive signals from said store as well as from said position indicating means.

8. Apparatus as claimed in claim 7 in which said store is arranged to store reference signals corresponding to a plurality of possible paint stroke lengths for said spray gun and said first part of said automatic control means is arranged to select which stroke length reference signals are to be fed to said comparator.

9. Apparatus as claimed in claim 1 in which said comparator is a greater or less than comparator arranged to detect whether said signal from said position indicating means is greater or less than said reference signal value and provides an output signal accordingly.

10. The automatic paint spraying apparatus of claim 1 further including a plurality of spray guns, each spray gun being provided with reciprocating means, valve means and automatic control means.

11. Apparatus as claimed in claim 10 in which at least one of said spray guns is arranged to move vertically.

12. Apparatus as claimed in claim 11 in which at least one of said spray guns is arranged to move horizontally.

13. Apparatus as claimed in claim 1 in which path adjusting means is provided to move the path of the spray gun closer to or further from the article to be coated.

14. Apparatus as claimed in claim 13 in which said path adjusting means includes electrical digital control means arranged for location within said hazardous atmosphere.

15. Apparatus as claimed in claim 14 in which said electrical digital control means is arranged to receive reference signals from the said first part of said automatic control means indicating a desired separation between the article and the path of said spray gun.

16. The automatic paint spraying apparatus of claim 1 further comprising conveyor means for conveying a succession of articles through the spray booth.

* * * * *